United States Patent
Vogl et al.

(10) Patent No.: US 7,594,572 B2
(45) Date of Patent: Sep. 29, 2009

(54) CONVEYING LINE WITH A DRIVING ROLLER

(75) Inventors: Peter Vogl, Bad Wörishofen (DE); Johann Lochbrunner, Neu-Ulm (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 95 days.

(21) Appl. No.: 11/061,479

(22) Filed: Feb. 22, 2005

(65) Prior Publication Data
US 2005/0183933 A1    Aug. 25, 2005

(30) Foreign Application Priority Data
Feb. 23, 2004    (DE) .................. 10 2004 009 058

(51) Int. Cl.
*B65G 13/06*    (2006.01)
(52) U.S. Cl. ............. 198/781.11; 198/789; 198/781.07; 198/791
(58) Field of Classification Search ............... 198/781.1, 198/780, 781.01, 623, 781.11
See application file for complete search history.

(56) References Cited

U.S. PATENT DOCUMENTS

| | | | | |
|---|---|---|---|---|
| 1,589,079 | A | * | 6/1926 | Johnson et al. .............. 165/120 |
| 3,603,682 | A | * | 9/1971 | Sheridon et al. ............... 356/2 |
| 3,803,682 | A | * | 4/1974 | Stein ........................... 198/791 |
| 4,116,325 | A | * | 9/1978 | McDonald ............... 198/482.1 |
| 4,421,224 | A |   | 12/1983 | Dingman .................... 198/781 |
| 4,987,993 | A | * | 1/1991 | Dohmeier ................... 198/499 |
| 6,468,019 | B1 | * | 10/2002 | Duval .................... 414/416.01 |
| 6,502,690 | B1 | * | 1/2003 | Specht ....................... 198/789 |
| 2005/0061630 | A1 | * | 3/2005 | Lutz et al. .................... 198/789 |
| 2005/0173226 | A1 | * | 8/2005 | Gold et al. .................. 198/570 |
| 2005/0173266 | A1 | * | 8/2005 | Agarwal et al. ........... 205/784.5 |

FOREIGN PATENT DOCUMENTS

EP    0014666 A1    8/1980
NL    8000801    9/1981

* cited by examiner

*Primary Examiner*—Gene Crawford
*Assistant Examiner*—Kavel P Singh
(74) *Attorney, Agent, or Firm*—Jacobson Holman PLLC

(57) ABSTRACT

A conveying line, in particular a friction roller conveying line, with at least one driving roller driving goods, the driving roller being driven by a drive shaft and the drive shaft having a chain drive. The drive shaft driving the driving roller carries at least two toothed wheels which interact with at least one driving chain driven by the drive.

32 Claims, 3 Drawing Sheets

CONVEYING LINE WITH A DRIVING ROLLER

The invention refers to a conveying line, in particular friction roller line, with at least one driving roller driving the good, which is driven by a drive shaft, the drive shaft having a chain drive.

BACKGROUND OF THE INVENTION

Conveying lines of this type are known. They are characterised by the fact that each drive for the conveying line is realised via drive shafts which drive driving rollers with chain drives. The kinetic energy necessary for the drive is usually provided by a motor. The conveying line has here at least one driving roller driven by a drive shaft, which drives at least a portion, respectively a section, of the conveying line. For that purpose it is known to drive the drive shaft with a chain drive. According to the state of the art the drive shaft has a toothed wheel for that over which a chain drives the conveying line. It is also known to drive simultaneously several drive shafts via a chain.

The problem of this type of drives of conveying lines is that the conveying lines are blocked at times because of machining cycles in such a way that the blocking devices are turned into the conveying line in order to block the conveyed good. The result is that the chain and the toothed wheel are, of course, stressed more than usual. As the driving chains have a considerable length the result is further that, if for example several drive shafts are driven by one chain, the chain is stressed also differently. By means of stress of the chains by a concussion or an impact the life of the chains is reduced considerably.

Therefore it is, for example, necessary that, if the chain is stretched more than 3%, it has to be replaced. This happens usually with a suitable load after several years. Often the life of the chain of the conveying line is significantly shorter than the life of the production installation in which the conveying line is integrated. It may be possible to compensate this slow lengthening of the chain by regular removing chain links, however, the chain has to be replaced if correspondingly stretched more than 3%, as the interaction between chain and toothed wheel cannot be guaranteed anymore. The removal of individual chain links as well as the replacement of the entire chain is very expensive for corresponding conveying lines which extend over a larger distance.

BRIEF SUMMARY OF THE INVENTION

Departing from this state of the art it is an object of the invention to develop a conveying line which requires less maintenance.

In order to solve this problem the invention suggests a conveying line, in particular friction roller line, with at least one driving roller driving the good which is driven by a drive shaft, and a chain drive which drives the drive shaft, which is characterised by the fact that the drive shaft driving by the driving roller carries two toothed wheels which interact with at least one driving chain and a drive which drives the driving chain. This embodiment effects that the load of the chain is reduced to 50% per chain if it is assumed that each toothed wheel carries a separate chain, respectively each toothed wheel is assigned an individual driving chain. This is provided, for example, according to an advantageous development of the invention.

In the same way it is, of course, also provided that the driving chain is designed as double link chain. By means of the two toothed wheels acting separately which interact with the driving chain and the drive, it is now fact that during conveying the load altogether is distributed to two chains, and thus by means of the assignment from two chains to two toothed wheels or from one double link chain to these two toothed wheels an optimum distribution of the load is possible. Such double link chains are also known as duplex chains, they include two chain links arranged one beside the other with a common centerpiece. By means of the solution according to the invention now a considerable increased life is reached. The effort in maintenance is reduced considerably because the complicated replacing of the chains of a chain drive takes, at least for the length provided on the conveying lines, a significant period of working time.

According to a development the invention is characterised by the fact that the drive shaft has at least one spring the spring power of which presses the toothed wheels against a coupling formed at the shaft. Here it is furthermore an advantage if the toothed wheels are arranged rotatably on the drive shaft.

It is in particular convenient here if both toothed wheels are arranged rotatably separately from each other on the drive shaft. These features together effect that, as described before, the toothed wheels provide together with the clutch disc of the coupling and the spring that occurring impacts by blockings now can be intercepted better. The modifications of the invention described previously now effect that four frictional faces altogether are available for the transmission of the driving power. By means of that it is now possible to reduce the spring power of the pressure spring. For example, it is now possible to cut the spring power in two, and to transmit the same driving momentum nevertheless. Because now four frictional faces are available altogether according to the invention a higher security of the transmission of the driving momentum is also reached because it is not probable that all four frictional faces are soiled at the same time. If only one frictional face is soiled it is rather possible to go on with the operation of the conveying line. Of course, it is also a fact that with only a small amount of dirt this will be removed again by the friction, respectively the rotation of the friction faces on each other, so that this results in a sort of automatic cleaning. In this respect the invention presents a number of convenient possibilities which make it possible that the installation can be operated with less faults and to prolong the maintenance cycles.

According to an advantageous development of the invention an intermediate ring is provided which is arranged between the two toothed wheels on the drive shaft. This intermediate ring is, as well as the toothed wheels, supported rotatably on the drive shaft, and is also pressed by the power of the spring against the toothed wheels. The intermediate ring can be turned here versus the two toothed wheels.

It is also an advantage if a pressure sleeve is provided which transmits the power of the spring to the toothed wheels and the coupling. This pressure sleeve is an advantage on the side facing the spring as by means of it the spring power can be transmitted much better and more uniform at least to the first toothed wheel seen from the direction of the spring. The pressure sleeve is here also designed in the way of a disc with a connection for receiving a spring so that the power transmission is carried out parallel and extremely continuously, respectively uniformly, to the toothed wheels and the coupling. Of course, it is, for that purpose, arranged mobile on the drive shaft.

Another aspect of the invention is the fact that an adjustment device is provided by means of which the frictional force, respectively the adhesion power, which has to be transmitted via the coupling, can be varied, respectively adjusted.

By means of an adjustment device which is preferably also arranged on the shaft, respectively on the coupling arranged over the shaft in the way of a sleeve, the power of the spring, which presses the coupling, respectively the pressure sleeve against the toothed wheels, can be varied in a simple manner. Of course, the invention also includes other adjustment devices. The adjustment device is not restricted to an increasing, respectively reducing, of the spring power. However, by means of an adjustment device the frictional force can be increased as well as reduced. For example, when the frictional surfaces are worn and thus the power transmission is no more sufficient, it is possible to increase the drive force. If the conveyed good is varied, however, it may be necessary to reduce the frictional force in order to prevent a blocking of the driving rollers of the roller line itself. In this respect both modifications of the power variation are comprised by the invention.

The coupling is preferably designed as clutch disc in order to be able to receive the frictional forces optimally. However, it is dimensioned in such a way that sliding is guaranteed in the case of blocking of the conveying line in order to prevent a damage of the drive and to guarantee a continuous operation of the drive. This is then a sliding clutch.

In the case that larger driving moments have to be transmitted it is provided that the coupling has on its side facing the toothed wheel a coating which increases the friction.

Of course, it is also possible to provide at least one of the toothed wheels on the side facing the coupling and/or the respective other toothed wheel with a coating which increases the friction.

A development of the modifications described before provides that all faces of the toothed wheels, the pressure sleeve, the intermediate ring, and the coupling facing each other are provided with coatings increasing the friction. This is in every case done to that extent, as it is necessary according to the purposes of use of the respective conveying line. This depends, of course, to a large extent on the goods which have to be conveyed in each case.

According to a development of the invention the spring is supported in a spring hanger which is arranged preferably on the side of the drive shaft turned away from the coupling.

The spring for the coupling may be designed according to a convenient development as spring subjected to pressure stress.

However, it is also provided according to the invention to design a spring which is subjected to tensile stress. For that purpose only the respective guide and fastening elements have to be adjusted accordingly, if necessary.

The spring power may be varied by adjusting the position of the spring hanger. This may be reached by mechanical adjustment devices as well as by motor driven ones. In this case then the spring hanger acts as adjustment device for varying the frictional force.

The adjustment device is, according to a modification of the invention, designed as sleeve which can be screwed on a thread provided on the coupling for varying the friction. Because the sleeve can be adjusted on the coupling it is possible to vary the pressure force of the spring so that a modifying of the friction, respective adhesive power, for the coupling and, if necessary, for the intermediate ring(s) can be reached. Varying of the friction is here carried out by varying the position of the sleeve on the coupling.

For adjustment the sleeve preferably has on its outside a hexagon which serves for turning the sleeve and thus for varying the prestress. Conveniently this hexagon can be adjusted by means of a suitable wrench. Of course, it is also possible to act on this hexagon with a motor via corresponding means.

Another aspect of the solution according to the invention is the fact that between the sleeve and the coupling a safety device is provided by means of which the once-adjusted prestress can be defined. For that purpose it is in a simple manner possible to design the safety device as groove and tongue connection with a safety tongue or a safety bolt engaging into the groove. It is an advantage here if the safety tongue, respectively the safety bolt, itself is spring-supported in such a way that the tongue, respectively the bolt, engages automatically into the groove if the position is corresponding.

According to a development of the invention the drive shaft is supported on both sides in ball bearings which are arranged in a housing. In the same way it is, of course, also possible to support the drive shaft on one side or in the center in only one ball bearing. The one-sided support makes a very compact construction of the housing possible.

The housing has here, according to a convenient development, a detachable housing lid. This embodiment is in particular convenient as the housing and the housing lid may be made from, for example, extruded aluminum profiles. The housings may here be used for the purpose of use provided by the invention as well as for other machine elements which can be put in a housing. The housing parts are, according to a modification of the invention, connected to each other by clip links. One of the clip links may be here designed as a sort of joint or be circular, respectively ball-shaped, so that it can rotate.

The invention is characterised according to an embodiment by the fact that the arrangement of the elements is carried out in the order pressure sleeve, toothed wheel, drive shaft, respectively the arrangement of the power transmission elements is provided from the side turned away from the drive shaft in the order fastening element, spring hanger, spring, pressure sleeve, toothed wheel, intermediate ring, toothed wheel, and coupling. This embodiment is, for example, an advantage if the housing is provided not too compact, and a support of the shaft is possible, for example, with two ball bearings.

The more compact modification of the embodiment of the housing results in particular from the arrangement, provided according to another modification of the invention, of the power transmission elements according to which the arrangement of the elements is in the order toothed wheel, pressure sleeve, drive shaft, respectively is arranged, seen from the end turned away from the drive shaft, in the order coupling, toothed wheel, intermediate ring, toothed wheel, intermediate ring, pressure sleeve, spring and sleeve as adjustment device.

The conveying line according to the invention is characterised by the fact that one drive shaft is provided for the drive of one section, respectively portion, of the conveying line. Of course, it is, according to the invention, also possible, for example, to drive all rollers via the corresponding drive shaft of a friction roller conveyor.

The invention also provided that the driving chain drives simultaneously several drive shafts. This reduces further the effort for the drive altogether.

A fastening element for the spring hanger is, according to a modification of the invention, provided on the drive shaft. It is an advantage here if this fastening element is designed, for example, as tensioning ring or the like. This tensioning ring may be used at the same time for varying the pressure moment of the spring.

According to the invention it has been found to be an advantage if in the housing a support rail is provided for the driving chain. This support rail supports the driving chain in the bottom part of the housing. It also provides that the driving chain in the region of the toothed wheels has always the same contact even if the chain is lowered in the bottom part, for example by stretching, respectively if the chain sags.

In the top part of the housing a holding-down appliance is provided for the driving chain. This holding-down appliance also serves for a proper guide of the driving chain over the toothed wheel(s).

Holding-down appliance and guide rail are, according to a convenient modification of the invention, fastened in the housing by a clip link. This makes a quick mounting of these machine elements possible, and, at the same time, also quite a quick change if a replacement is necessary because of the wear.

BRIEF DESCRIPTION OF THE SEVERAL VIEWS OF THE DRAWINGS

In the following the invention is described by means of embodiments and drawings in detail. In the drawings.

DETAILED DESCRIPTION OF THE PREFERRED EMBODIMENTS

Figure 1:
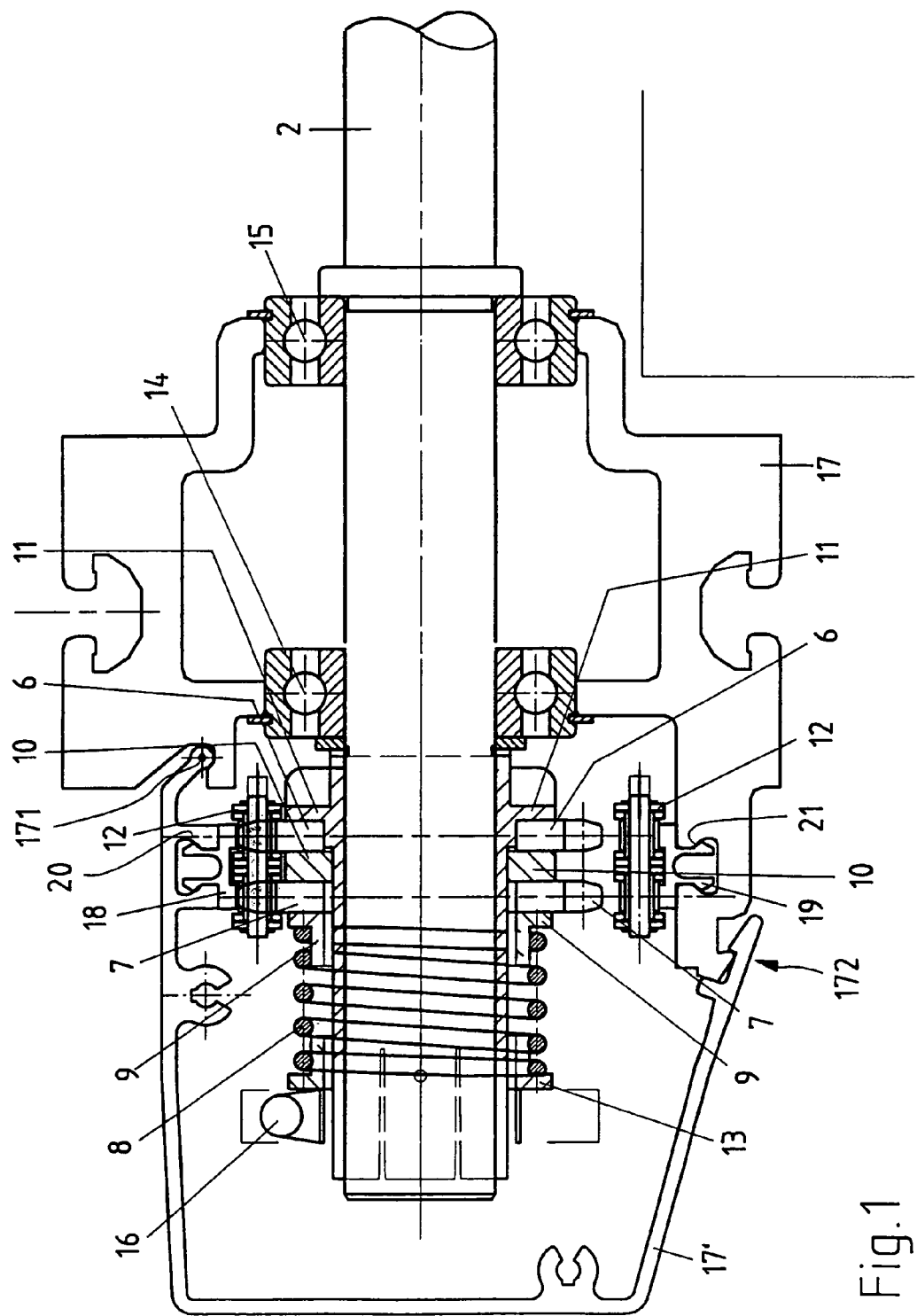
FIG. 1 a section through a drive shaft supported in a housing according to the invention.

FIG. 1 shows a section through a drive shaft 2 supported in a housing 17. The drive shaft 2 is here supported in ball bearings 14 and 15. On the right hand side of the drawing the drive shaft 2 is shown cut-off as the machine elements arranged there are not significant for the invention, so that this part will not be explained in detail. On this side, for example, the driving roller is arranged. In the housing 17 the drive shaft 2 is supported double. On the left hand side next to the ball bearing 14 there is the coupling 11. The coupling 11 is here pulled in the way of a sleeve over the left-side stump of the drive shaft 2, and has on the right hand side in the direction of the ball bearing 14 a clutch disc. The toothed wheels 6 and 7 are arranged rotatably on the sleeve of the coupling.

The toothed wheels 6 and 7 are held here by an intermediate ring 10 at a uniform distance. At the same time the intermediate ring 10 has two plane surfaces one of which facing the toothed wheel 6, and the other one facing the toothed wheel 7 which simultaneously transmit the frictional force, respectively the driving momentum, from the toothed wheels 6, 7 to the coupling. On the left hand side next to the toothed wheel 7 a pressure sleeve 9 is arranged which is pressed by the spring 8 against the toothed wheel 7. From the toothed wheel 7 the force is then transmitted further to the intermediate ring 10, and from there to the toothed wheel 6, and from there again to the clutch disc 11. By means of this arrangement according to the invention four frictional surfaces altogether result between coupling 11, toothed wheel 6, intermediate ring 10, toothed wheel 7, and pressure sleeve 9.

Spring 8 is supported in a spring hanger 13 which guarantees that the power of the spring can act each time in the direction of the coupling 11. For that purpose there is conveniently a fastening element 16 on the drive shaft 2 which guarantees that the spring 8 does not press the spring hanger 13 away in the opposite direction of the actually provided force of action. Over the toothed wheels 6 and 7 in the top region a driving chain 12 runs which interacts with a driving motor which is not shown in FIG. 1. Of course it is also possible to design the drive chain 12 as two-piece chain made from two single chains. The design with a double link chain, respectively duplex chain, however, has the effect that certain peaks of load which may occur during the start or blocking procedure on the conveying line, can be compensated better. The four frictional surfaces additionally present the possibility to reduce the pressure force by 50%, and nevertheless to transmit the same driving momentum.

The drive shaft 2 is supported in a housing 17. In the housing 17 here the ball bearings 14 and 15 are arranged. On the right hand side of the drawing according to FIG. 1 it can be seen that the housing is covered by a housing lid 17'. Preferably this lid is supported rotatably in the top part on the housing, and on the bottom part attached with a clamping link, respectively clip link.

From the drawing of the housing it can be discerned that this housing can also be used for supporting other machine elements than the ones according to the invention. For that purpose in particular in the interior of the housing 17, respectively at the housing lid 17', suitable fastening points are provided. In the bottom region of the housing 17 a support rail 19 is clipped into the housing 17. This support rail 19 is here fastened by means of the clip link 21 in the bottom part of the housing 17. The support rail 19 here supports the chain, and provides a proper guide of the driving chain 12 over the toothed wheels 6 and 7. In the top region of the housing lid 17' a holding-down appliance 18 is provided which is fastened at the housing lid 17'. According to the embodiment of FIG. 1 this holding-down appliance 18 is also fastened by means of a clip link 20 at the housing lid 17'. The holding-down appliance 18 also provides a proper guide of the driving chain 12 over the toothed wheels 6 and 7.

In the section drawing of the housing 17, respectively the housing lid 17', it can be seen that these construction components may very well be manufactured from extruded aluminum profiles. In particular the design of the profile of the clip links and fastening links can be manufactured very well and economically by means of such profiles in a extrusion moulding process, respectively through extrusion.

Figure 2:
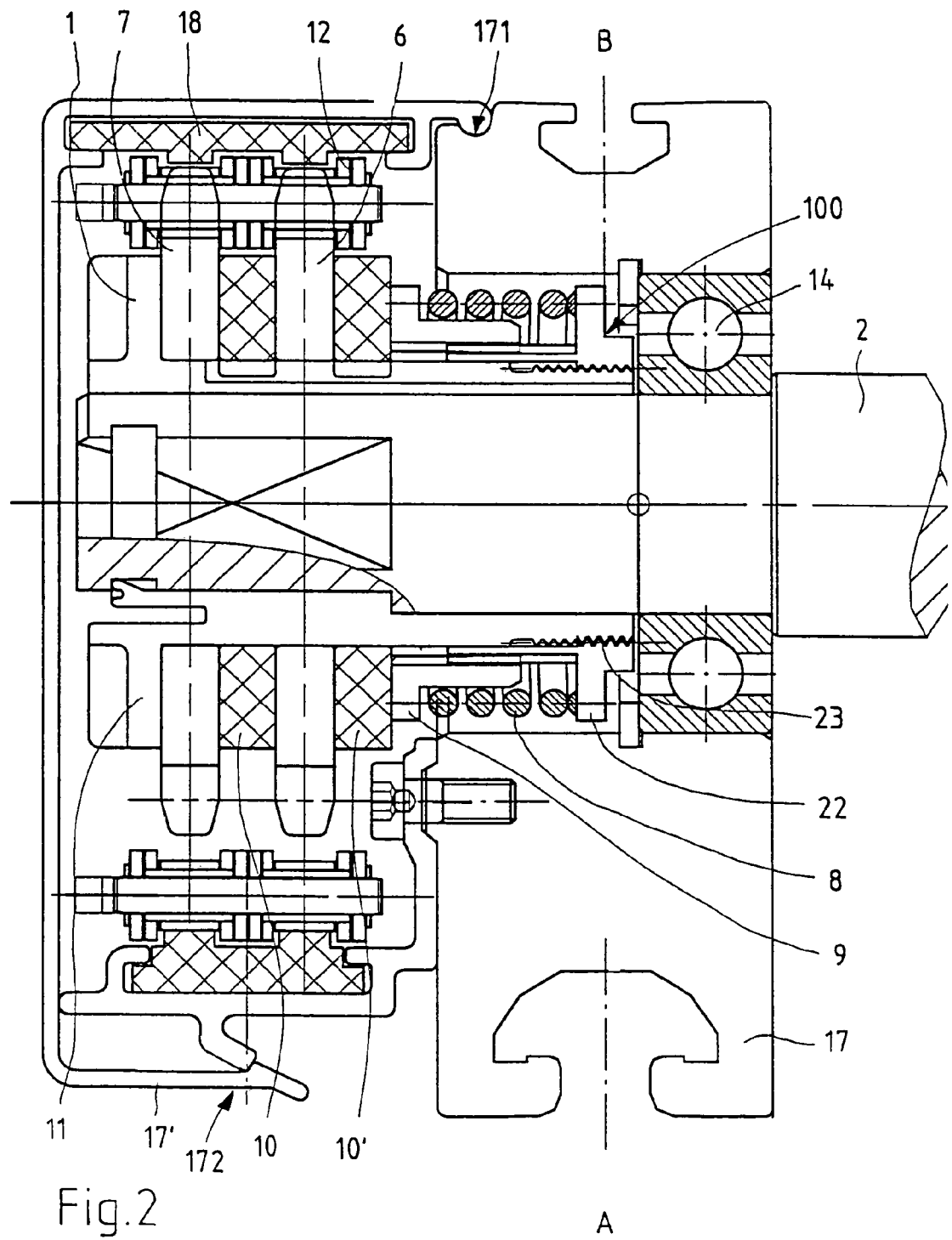
FIG. 2 a section through another embodiment of the invention.

FIG. 2 shows a section through another embodiment of the invention. This embodiment is characterised by a very compact construction of the housing comprising the housing parts 17 and 17'. This is reached by the particular way of arrangement and support of the drive shaft 2 in the housing 17. The drive shaft 2 is here only supported by one ball bearing 14. On the shaft the coupling 11 is arranged which acts on the toothed wheel 7, seen from the left hand side in the view. Between the toothed wheel 7 and the toothed wheel 6 an intermediate ring 10 is arranged. Another intermediate ring 10' is arranged between the pressure sleeve 9 and the toothed wheel 6. The pressure sleeve 9 is, as already shown in the embodiment according to FIG. 1, pressed by a spring 8 against the intermediate ring 10' and the toothed wheel 6. The coupling 11 is, because of the pressure of this spring, also pressed against the toothed wheel 7. A sleeve 22 is screwed on the coupling by means of a thread 23 seen in the view from the right hand side. By means of screwing on the sleeve 22 the pressure force of the spring 8 and thus the pressure force of the coupling 11 and the intermediate rings 10, respectively 10', on the toothed wheels 6 and 7 can be varied. If the sleeve 22 is screwed on the coupling 11 relatively far, the pressure force of the spring 8 increases. If the sleeve 22 is screwed back the pressure force of the spring is reduced. By means of that the frictional power, respectively the adhesive force, which is transmitted by the coupling 11 including the intermediate rings 10 and 10' to the toothed wheels 6 and 7, can be influenced. All other reference numbers have already been described when the FIG. 1 was presented, so that now a repetition of these reference numbers is not necessary.

Figure 3:
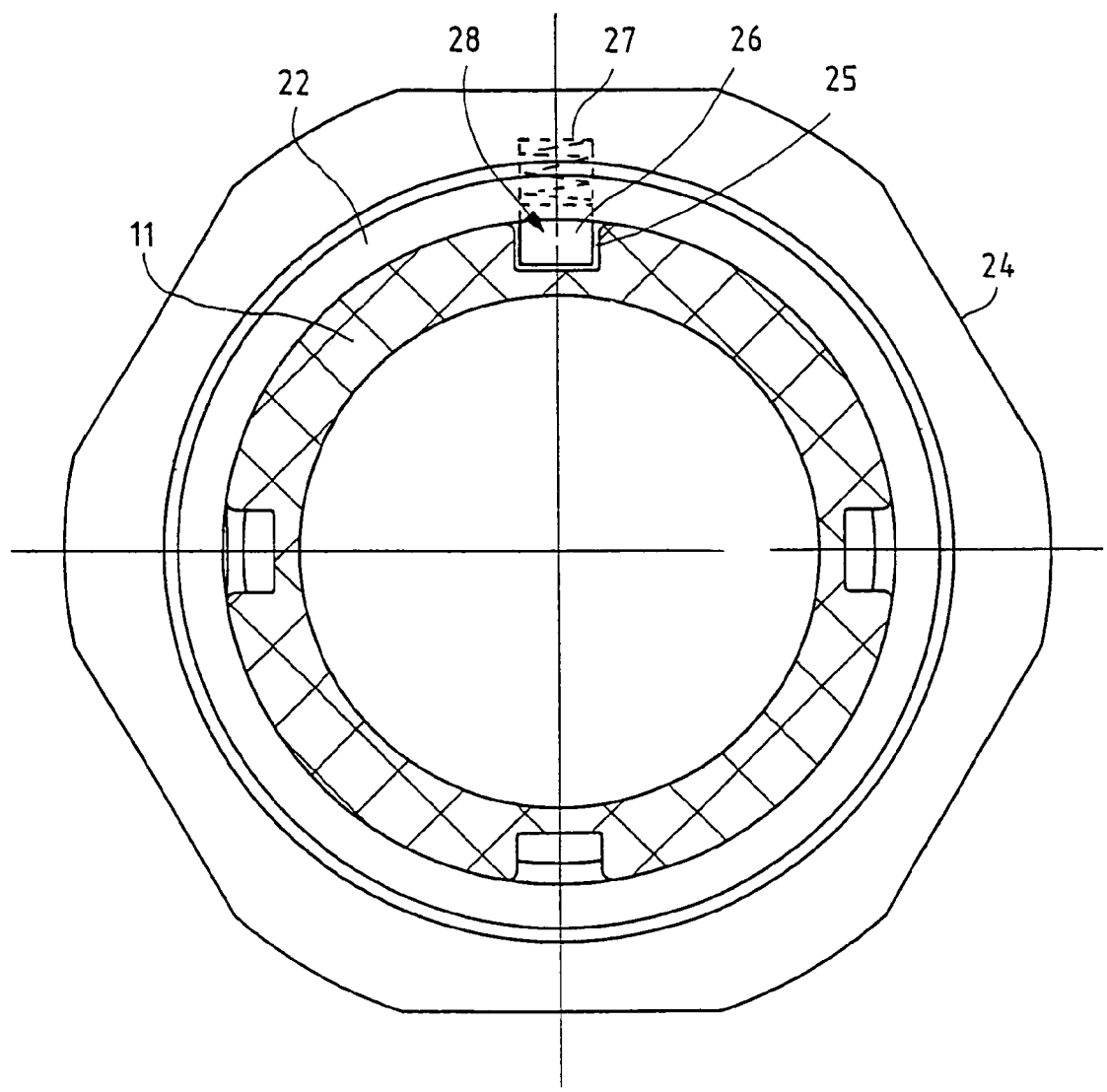
FIG. 3 a front view of a detail of the embodiment according to FIG. 2.

FIG. 3 shows the front view of a detail of the embodiment of FIG. 2. This is a section along the line A, B. In this view the embodiment of the sleeve 22 is shown with a flange designed essentially as hexagon 24. The hexagon serves here for turning the sleeve 22 on the coupling 11. For securing the once-adjusted frictional power a safety device is provided which comprises a safety bolt 26 which engages in a groove 25 when the bolt has a corresponding position to the groove 25. In order to design the safety device essentially automatically a safety spring 27 is indicated schematically which presses automatically the safety bolt 26 in the groove 25 when the position is suitable. This safety device may be provided, of course, as indicated in FIG. 3, at several points between the coupling 11 and the sleeve 22. However, it is sufficient if only a single safety device is provided. The safety device here is not restricted to a bolt engaging in a groove. The safety device may rather be a conventional groove and tongue connection where the tongue engages in the groove when the safety position is reached. By means of that the frictional power of the adjustment device is secured. However, it may be, at any time, readjusted, respectively re-set if, for example, the frictional faces at the toothed wheels 6 and 7, respectively at the intermediate rings 10 and 10', respectively at the coupling 11, are worn.

Although the invention has been described by exact examples which are illustrated in the most extensive detail it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. A friction roller line for conveying goods, the friction roller line comprising
 a driving roller,
 a drive shaft driving the driving roller,
 two toothed wheels carried by and spaced apart on the drive shaft, the two toothed wheels interacting with at least one driving chain,
 a coupling located on the drive shaft,
 at least one spring mounted on the drive shaft,
 a spring power of the at least one spring pressing the two toothed wheels in a direction of the coupling located on the drive shaft,
 a pressure sleeve located on the drive shaft,
 an intermediate ring arranged between the two toothed wheels,
 another intermediate ring arranged between one of the toothed wheels and the pressure sleeve, and
 an adjustment device adjustably pressing together the coupling, the two toothed wheels, the intermediate ring, the another intermediate ring and the pressure sleeve by the spring power.

2. The friction roller line according to claim 1, wherein the driving chain is a double-link chain.

3. The friction roller line according to claim 1, wherein an individual driving chain is assigned each of the two toothed wheels.

4. The friction roller line according to claim 1, wherein the toothed wheels are rotatably arranged on the drive shaft.

5. The friction roller line according to claim 1, wherein both toothed wheels are rotatably arranged independently from each other on the drive shaft.

6. The friction roller line according to claim 1, wherein the intermediate ring is twisted versus the toothed wheels.

7. The friction roller line according to claim 1, wherein the pressure sleeve transfers power of the spring to the toothed wheels and the coupling.

8. The friction roller line according to claim 1, wherein the coupling is a clutch disc, and transfers a turning moment via the toothed wheels to the drive shaft.

9. The friction roller line according to claim 1, wherein the coupling is provided on a side facing the toothed wheels with a coating increasing friction.

10. The friction roller line according to claim 1, wherein at least one of the toothed wheels is provided with a coating increasing friction on a side facing at least one of the coupling and the other toothed wheel.

11. The friction roller line according to claim 1, wherein at least one part of faces of the toothed wheels facing each other, of the pressure sleeve, the intermediate ring, and the coupling is provided with a coating increasing friction.

12. The friction roller line according to claim 1, wherein an arrangement of the elements is provided in an order of the pressure sleeve, the toothed wheels, and the drive shaft.

13. The friction roller line according to claim 1, wherein the spring has a spring hanger and a fastening element, and an arrangement of power transferring elements is, seen from an end turned away from the drive shaft, in order of fastening element, the spring hanger, the pressure sleeve, one of the toothed wheels, the intermediate ring, the other toothed wheel, and the coupling.

14. The friction roller line according to claim 1, wherein an arrangement of elements is carried out in an order of the toothed wheel, the pressure sleeve and the drive shaft.

15. The friction roller line according to claim 1, further comprising a sleeve of the adjustment device and an arrangement of power transferring is, seen from an end turned away from the drive shaft, in an order of the coupling, one of the toothed wheels, the intermediate ring, the other toothed wheel, the another intermediate ring, the pressure sleeve, the spring and the sleeve.

16. The friction roller line according to claim 1, wherein a spring hanger is arranged on a side of the drive shaft turned away from the coupling, and a position of the spring hanger on the drive shaft is variable.

17. The friction roller line according to claim 1, wherein a spring hanger is arranged on a side of the drive shaft turned away from the coupling, and a position of the spring hanger as the adjustment device on the drive shaft is variable, and the adjustment device includes a sleeve screwed on a thread provided at the coupling for varying friction.

18. The friction roller line according to claim 1, wherein a spring hanger is arranged on a side of the drive shaft turned away from the coupling, and a position of the spring hanger as the adjustment device on the drive shaft is variable, and the adjustment device includes a sleeve screwed on a thread provided at the coupling for varying friction, and the sleeve has an external hexagon serving for adjusting, respectively turning, the sleeve for varying prestress.

19. The friction roller line according to claim 1, wherein a spring hanger is arranged on a side of the drive shaft turned away from the coupling, and a position of the spring hanger as the adjustment device on the drive shaft is variable, and the adjustment device includes a sleeve screwed on a thread provided at the coupling for varying friction, and between the sleeve and the coupling a safety device is provided to define prestress.

20. The friction roller line according to claim 1, wherein a spring hanger is arranged on a side of the drive shaft turned away from the coupling, and a position of the spring hanger as the adjustment device on the drive shaft is variable, and the adjustment device includes a sleeve screwed on a thread provided on the coupling for varying friction, and between the sleeve and the coupling a safety device is provided to define a once-selected prestress, and the safety device includes a groove and tongue connection with a safety bolt engaging in the groove.

21. The friction roller line according to claim 1, wherein a spring hanger is arranged on a side of the drive shaft turned away from the coupling, and a position of the spring hanger as the adjustment device on the drive shaft is variable, and the adjustment device includes a sleeve screwed on a thread provided on the coupling for varying friction, and between the sleeve and the coupling a safety device is provided to define a once-selected prestress, and the safety device includes a groove and tongue connection with a safety bolt engaging in the groove, and the safety bolt is spring-supported in such a way that the safety bolt engages automatically in the groove if a position of the groove and the safety bolt correspond.

22. The friction roller line according to claim 1, wherein the spring is subjected to pressure stress.

23. The friction roller line according to claim 1, wherein the spring is subjected to tensile stress.

24. The friction roller line according to claim 1, wherein the drive shaft is supported either in ball bearings on both sides, or in only one ball bearing on one side, and the ball bearings are arranged in a housing.

25. The friction roller line according to claim 1, wherein the drive shaft is supported either in ball bearings on both sides, or in only one ball bearing on one side, and the ball bearings are arranged in a housing, and the housing has a detachable housing lid.

26. The friction roller line according to claim 1, wherein the drive shaft is supported either in ball bearings on both sides, or in only one ball bearing on one side, and the ball bearings are arranged in a housing, and the housing has a detachable lid, and at least one of the housing and the housing lid is made from aluminum profiles.

27. The conveying friction roller line according to claim 1, wherein a spring hanger is arranged on a side of the drive shaft turned away from the coupling, and a fastening element is provided for the spring hanger on the drive shaft.

28. The friction roller line according to claim 1, wherein a spring hanger is arranged on a side of the drive shaft turned away from the coupling, and a fastening element is provided for the spring hanger on the drive shaft, and the fastening element is a tensioning ring adjustably arranged on the drive shaft.

29. The friction roller line according to claim 1, wherein the drive shaft is supported either in ball bearings on both sides, or in only one ball bearing on one side, and the ball bearings are arranged in a housing, and in the housing a support rail is provided for the at least one driving chain.

30. The friction roller line according to claim 1, wherein the drive shaft is supported either in ball bearings on both sides, or in only one ball bearing on one side, and the ball bearings are arranged in a housing, and in the housing a holding-down appliance is provided for the at least one driving chain.

31. The friction roller line according to claim 30, wherein the housing has a clip link for fastening the holding-down appliance.

32. A friction roller line for conveying goods, the friction roller line comprising
   a driving roller,
   a drive shaft driving the driving roller,
   two toothed wheels carried by the drive shaft, the two toothed wheels interacting with at least one driving chain,
   a coupling located on the drive shaft,
   at least one spring mounted on the drive shaft,
   a spring power of the at least one spring pressing the two toothed wheels in a direction of the coupling located on the drive shaft,
   a pressure sleeve located on the drive shaft,
   an intermediate ring arranged between the two toothed wheels,
   another intermediate ring arranged between one of the toothed wheels and a the pressure sleeve,
   an adjustment device adjustably pressing together the coupling, the two toothed wheels, the intermediate rings and the pressure sleeve by the spring power, and
   a spring hanger of the adjustment device arranged on a side of the drive shaft facing in a direction away from the coupling.

* * * * *